(12) United States Patent
Kim et al.

(10) Patent No.: US 10,360,480 B2
(45) Date of Patent: Jul. 23, 2019

(54) TERMINAL DEVICE AND CONTROL METHOD

(71) Applicant: LG ELECTRONICS INC., Seoul (KR)

(72) Inventors: Sujin Kim, Seoul (KR); Sunghye Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/755,364

(22) PCT Filed: Sep. 25, 2015

(86) PCT No.: PCT/KR2015/010171
§ 371 (c)(1),
(2) Date: Feb. 26, 2018

(87) PCT Pub. No.: WO2017/051953
PCT Pub. Date: Mar. 30, 2017

(65) Prior Publication Data
US 2018/0247165 A1  Aug. 30, 2018

(51) Int. Cl.
*G06K 9/62* (2006.01)
*G06Q 20/12* (2012.01)
(Continued)

(52) U.S. Cl.
CPC ......... *G06K 9/6292* (2013.01); *G06F 3/0482* (2013.01); *G06F 3/0488* (2013.01);
(Continued)

(58) Field of Classification Search
CPC . G06K 9/6292; G06F 3/04817; G06F 3/0482; G06F 3/04842; G06F 3/0488;
(Continued)

(56) References Cited

U.S. PATENT DOCUMENTS 8,515,824 B2 * 8/2013 Herring .................. G06Q 30/06
705/16
9,710,826 B1 * 7/2017 Daniel ............... G06Q 30/0257
(Continued)

FOREIGN PATENT DOCUMENTS

KR        10-0888338 B1       3/2009
KR     10-2011-0006547 A      1/2011
(Continued)

*Primary Examiner* — Ariel A Balaoing
(74) *Attorney, Agent, or Firm* — Birch, Stewart, Kolasch & Birch, LLP

(57) ABSTRACT

A terminal including a display unit; a memory; a camera; and a controller configured to control the display unit to display an image of a product obtained by the camera, control the camera to capture the image of the product as a normal image in response to a preset first command, control the camera the capture the image of the product as a purchase related image together with purchasing information for purchasing the product in response to a preset second command, and control the display unit to display a thumbnail image screen including the purchase related image and the normal image in response to an input of a thumbnail image display command.

20 Claims, 15 Drawing Sheets

(51) Int. Cl.
  *G06Q 20/32*    (2012.01)
  *G06Q 30/06*    (2012.01)
  *G06F 3/0481*   (2013.01)
  *G06F 3/0482*   (2013.01)
  *G06F 3/0484*   (2013.01)
  *G06F 3/0488*   (2013.01)
(52) U.S. Cl.
  CPC ...... *G06F 3/04817* (2013.01); *G06F 3/04842* (2013.01); *G06Q 20/12* (2013.01); *G06Q 20/322* (2013.01); *G06Q 30/0601* (2013.01)
(58) Field of Classification Search
  CPC ... G06Q 20/12; G06Q 20/322; G06Q 30/0601
  See application file for complete search history.

(56) References Cited

U.S. PATENT DOCUMENTS

| | | | |
|---|---|---|---|
| 10,089,329 B2* | 10/2018 | Boncyk | G06Q 20/10 |
| 2001/0024212 A1* | 9/2001 | Ohnishi | G06F 3/04817 |
| | | | 715/769 |
| 2004/0199435 A1* | 10/2004 | Abrams | G06Q 30/06 |
| | | | 705/27.2 |
| 2011/0320317 A1 | 12/2011 | Yuan et al. | |
| 2014/0244392 A1* | 8/2014 | Chang | G06Q 10/087 |
| | | | 705/14.58 |
| 2019/0005571 A1* | 1/2019 | Cho | G06F 3/048 |

FOREIGN PATENT DOCUMENTS

| | | |
|---|---|---|
| KR | 10-2011-0074838 A | 7/2011 |
| KR | 10-2015-0055446 A | 5/2015 |

* cited by examiner (a)  (b)

TERMINAL DEVICE AND CONTROL METHOD

CROSS REFERENCE TO THE RELATED APPLICATIONS

This application is the National Phase of PCT International Application No. PCT/KR2015/010171, filed on Sep. 25, 2015, which is hereby expressly incorporated by reference into the present application.

BACKGROUND OF THE INVENTION

Technical Field

The present invention relates to a terminal and controlling method thereof.

Background Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive multicast signals which permit viewing of contents such as broadcasts, videos and television programs.

Such terminals perform various functions such as capturing images and video, playing music or video files, game playing, receiving broadcasts and the like by being configured as multimedia players.

Ongoing efforts are made to support and increase the functionality of terminals. Such efforts include software and hardware improvements, as well as changes and improvements in the structural components.

Meanwhile, a user can capture an image or take a photo using a terminal. The image or photo may contain a product therein. Hence, the demand for a technique for facilitating a purchase of the product contained in the image or photo is increasingly rising.

SUMMARY OF THE INVENTION

One technical task of the present invention is to solve the above problem and other problems. Another technical task of the present invention is to provide a terminal and controlling method thereof, which facilitate a purchase of a product contained in an image.

Technical tasks obtainable from the present invention are non-limited by the above-mentioned technical task. And, other unmentioned technical tasks can be clearly understood from the following description by those having ordinary skill in the technical field to which the present invention pertains.

In one technical aspect of the present invention, provided herein is a terminal, including a display unit displaying an image of a product of which information for a purchase is indicated, a storage unit, and a controller configured to temporarily capture the image of the product, control the storage unit to store the captured image as a normal image if receiving a preset first command, and control the storage unit to store the captured image as a purchase related image together with the information for the purchase if receiving a preset second command, wherein the controller is further configured to control the display unit to display a thumbnail image screen including the purchase related image if receiving an input of a thumbnail image display command, display the purchase related image and the normal image together on the thumbnail image screen if the normal image exists, and display the purchase related image in a manner that the information for the purchase and a purchase button are contained in the purchase related image.

The controller may control the product image to be located in a center area within the purchase related image.

The controller may control the display unit to display a purchase related screen of the product if the displayed purchase button is selected.

The controller may control the display unit to display a card set as a default for payment on the purchase related screen.

If the payment is ended, the controller may switch to the thumbnail image screen.

If the payment is ended, the controller may control the display unit to display a receipt button by switching the purchase button to the receipt button and also display payment statement information by switching the information for the purchase to the payment statement information.

The controller may control the display unit to display receipt information if the displayed receipt button is selected.

The controller may control the display unit to display summary information of a receipt if a swipe gesture is inputted to the displayed receipt button.

The thumbnail image screen may include a first purchase related image and a second purchase related image, the first purchase related image may include an image of a first product, an information for a first purchase and a first purchase button, and the second purchase related image may include an image of a second product, an information for a second purchase and a second purchase button. If receiving an input of moving the first purchase related image to the second purchase related image, the controller may control the display unit to display a merged purchase related image by merging the first purchase related image and the second purchase related image together, display a merged information for purchases by merging the information for the first purchase and the information for the second purchase together, and display a merged purchase button by merging the first purchase button and the second purchase button together.

If the merged purchase button is selected, the controller may control the display unit to display a purchase related screen including both of the first product and the second product.

If receiving an input of a command for moving the first purchase related image within the merged purchase related image, the controller may control the display unit to display the first purchase related image and the second purchase related image separately, display the information for the first purchase and the information for the second purchase separately, and display the first purchase button and the second purchase button separately.

If a swipe gesture is inputted to the displayed purchase button, the controller may control the display unit to display the information for the first purchase and the information for the second purchase separately and also display the first purchase button and the second purchase button separately.

If receiving an input of a command for moving the normal image to the image for the purchase, the controller may extract a purchase item contained in the normal image.

The normal image may include a video image.

And, the controller may switch the normal image having the purchase item extracted therefrom to the image for the purchase.

In another technical aspect of the present invention, provided herein is a method of controlling a terminal, including displaying an image of a product of which information for a purchase is indicated, after temporarily capturing the image of the product, storing the captured image as a normal image if receiving a preset first command and storing the captured image as a purchase related image together with the information for the purchase if receiving a preset second command, displaying a thumbnail image screen including the purchase related image if receiving an input of a thumbnail image display command, displaying the purchase related image and the normal image together on the thumbnail image screen if the normal image exists, and displaying the purchase related image in a manner that the information for the purchase and a purchase button are contained in the purchase related image.

The method may further include displaying a purchase related screen of the product if the displayed purchase button is selected.

The method may further include displaying a card set as a default for payment on the purchase related screen.

And, the method may further include extracting a purchase item contained in the normal image if receiving an input of a command for moving the normal image to the image for the purchase.

A mobile terminal and controlling method thereof according to the present invention provide the following effects and/or features.

Advantageously, according to at least one of embodiments of the present invention, a product can be purchased using an image.

Advantageously, according to at least one of embodiments of the present invention, receipt information can be checked easily after an end of purchase.

Advantageously, according to at least one of embodiments of the present invention, products contained in a plurality of images can be purchased collectively or a plurality of products can be purchased separately.

Advantageously, according to at least one of embodiments of the present invention, a purchasable product contained in a normal image can be extracted and purchased.

Advantageously, an offline purchase of a product is facilitated using a camera.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
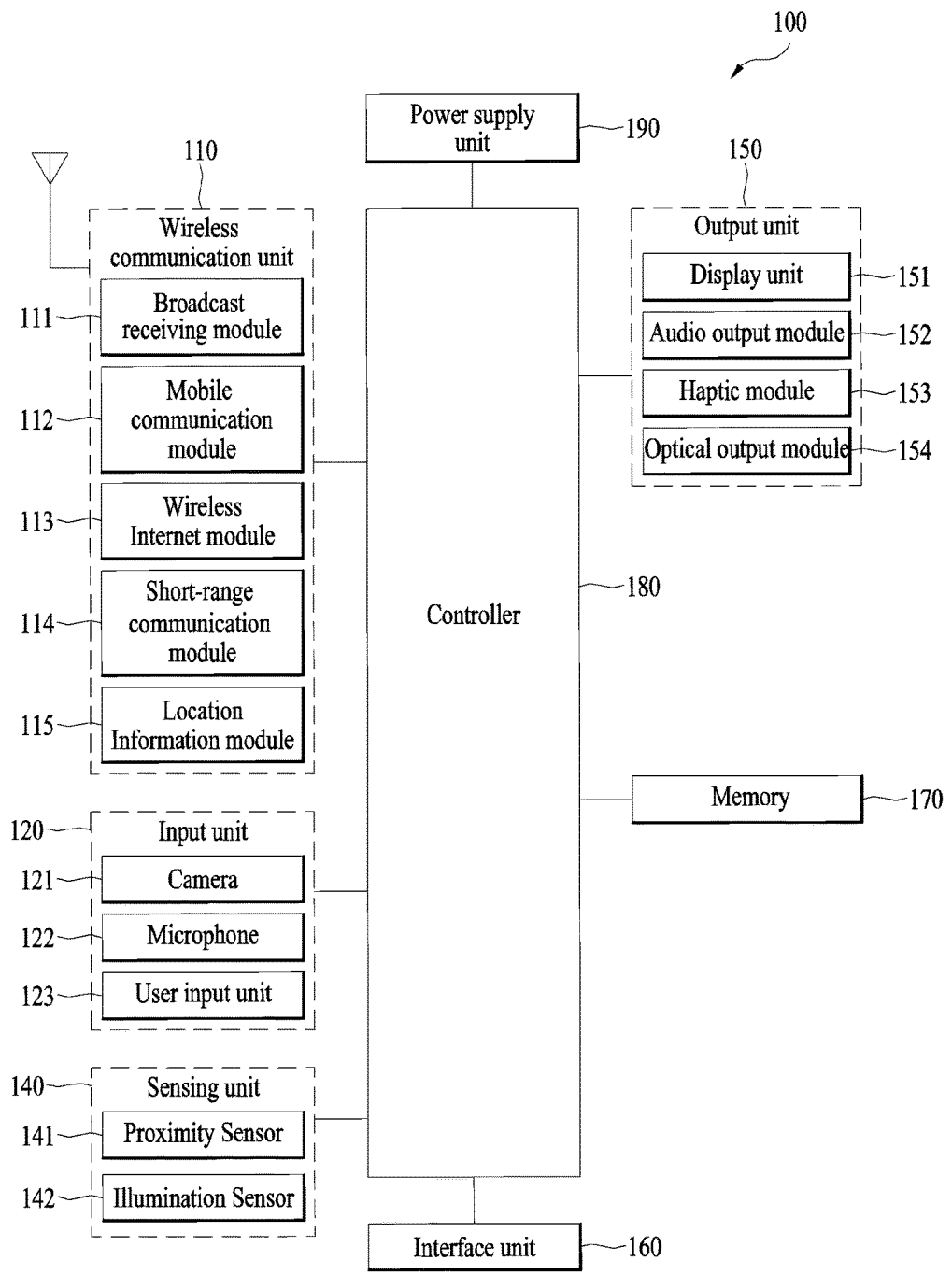
FIG. 1A is a diagram to describe a mobile terminal related to the present invention.
Figure 1B:
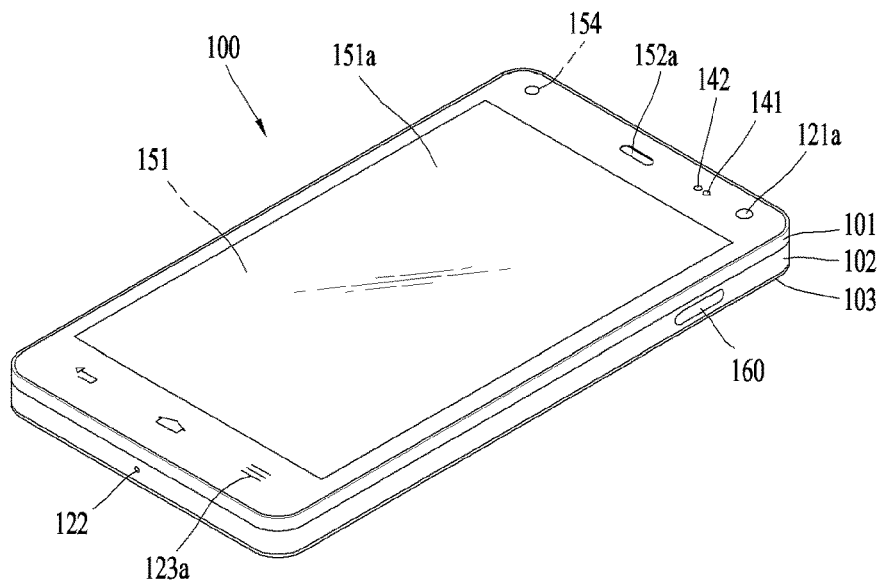
FIG. 1B and FIG. 1C are conceptual diagrams of a mobile terminal related to the present invention, viewed in different directions.
Figure 1C:
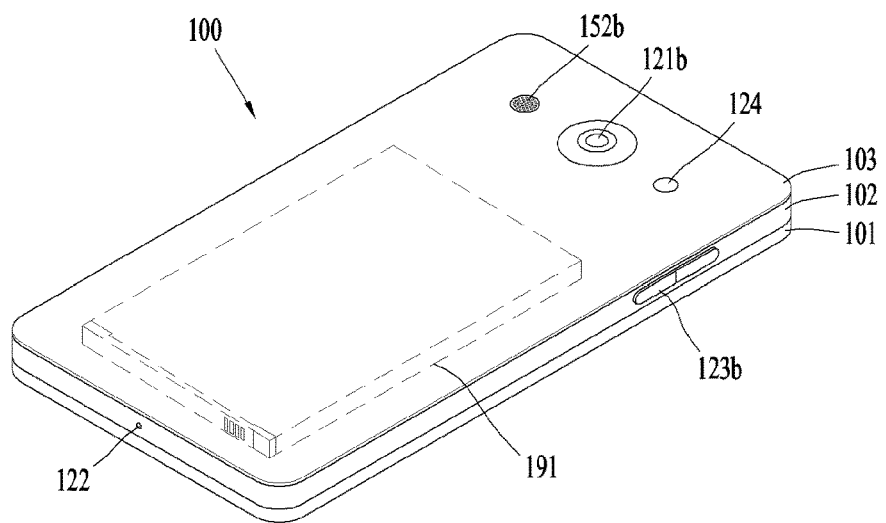

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user in a manner of processing a signal, data, information and the like inputted or outputted via the aforementioned configuration elements or executing an application program stored in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the configuration elements can operate in a manner of cooperating with each other to implement an operation of a mobile terminal, control of the mobile terminal or a method of controlling the mobile terminal according to various embodiments described in the following. And, the operation of the mobile terminal, the control of the mobile terminal or the method of controlling the mobile terminal can be implemented on the mobile terminal by driving at least one or more application programs stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. However, such teachings with regard to a particular type of mobile terminal will generally apply to other types of mobile terminals as well.

Discussion herein will often relate to a particular type of mobile terminal (for example, bar-type, watch-type, glasses-type, and the like).

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include the display unit 151, the first and second audio output unit 152a/152b, the proximity sensor 141, the illumination sensor 142, the optical output unit 154, the first and second camera 121a/121b, the first and second operation unit 123a/123b, the microphone 122, the interface unit 160 and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
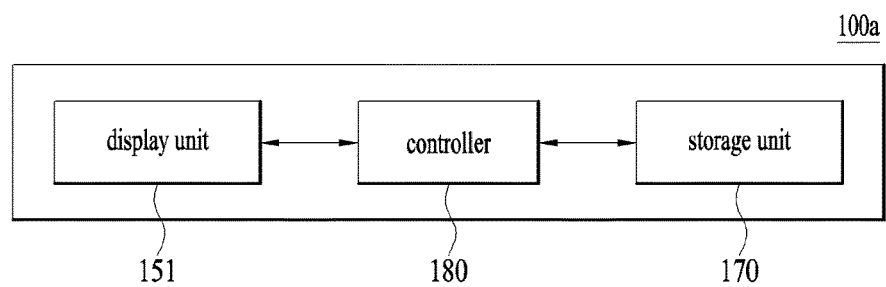
FIG. 2 is a block diagram of a terminal according to one embodiment of the present invention.

FIG. 2 is a block diagram of a terminal according to one embodiment of the present invention.

Referring to FIG. 2, a terminal 100a may include a display unit 151, a controller 180 and a storage unit 170.

The display unit 151 may display an image of a product of which information for purchase is displayed. If a user accesses a shopping site, the display unit 151 may display a shopping site screen. In response to a user's command, the display unit 151 may display various products. The shopping site screen may contain information for a purchase as well as a product. For example, information for a purchase may include a product name, a product code, a price, discount information and the like.

In the course of searching product images, the user may save one product image. The controller 180 may temporarily capture an image of a product. The controller 180 may inquire of the user about whether to save the temporarily captured image of the product as a normal image or a purchase related image. For example, if the user inputs a preset first command, the controller 180 can save a product image as a normal image. The normal image means a general capture image. If the user inputs a preset second command, the controller 180 can save a product image as a purchase related image. The purchase related image includes purchase related information and means an image linked to a shopping site. The purchase related image may include information for a purchase and a purchase button. If the purchase related image is selected, the controller 180 may display a purchase related screen for purchasing a product contained in an image.

The storage unit 170 may store an image captured in response to a user's selection as a normal image or a purchase related image.

The user saves a purchase related image and is then able to purchase a product later. For example, the user captures a product image and is then able to save it as a purchase related image. The terminal 100a may store a photo taken through a camera. The terminal 100a may store a taken photo, a captured normal image, a captured purchase related image, and the like.

The controller 180 may launch a gallery application in response to a user's command. The gallery application can display a stored image as a thumbnail image. The controller 180 may display a taken photo, a captured normal image, a captured purchase related image, and the like as thumbnail images. A video image may include video display & play time information. A purchase related image may include information for a purchase and a purchase button. For one example, a purchase related image may include a price and a purchase button. If the purchase button is selected, the controller 180 may execute a purchase process.

Various embodiments of a terminal and controlling method thereof are described as follows.

Figure 3:
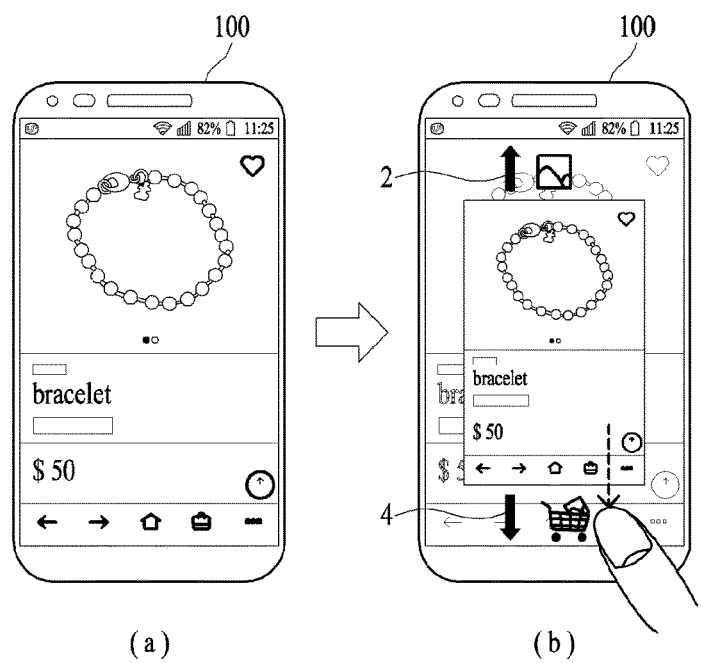
FIG. 3 is a diagram to describe one embodiment of saving as a purchase related image.

FIG. 3 is a diagram to describe one embodiment of saving as a purchase related image.

Referring to FIG. 3 (a), illustrated is a terminal 100 that displays a screen containing a product. A user may search products by accessing a shopping site. The shopping site may display a screen containing a product. And, the screen containing the product may contain information for a purchase as well. For example, the information for the purchase may include a product name, a product code, a price, a discount information and a purchase button. The user may progress a process for purchasing a displayed product by selecting the purchase button. Or, the user may capture a screen on which the product and the information for the purchase are displayed.

Referring to FIG. 3 (b), a screen for selecting a type of a captured image is illustrated. In case of a general terminal, if a user captures a screen, the captured screen can be saved as a normal image. Yet, according to the present invention, the terminal 100 may inquire of a user about whether to save a captured image as a normal image or a purchase related image. Namely, the user can select whether to save the captured image as the normal image or the purchase related image. The purchase related image may mean an image containing an information for a purchase and a purchase button.

The terminal 100 may recognize a gesture of swiping in a first direction as a command for saving as a normal image. And, the terminal 100 may recognize a gesture of swiping in a second direction as a command for saving as a purchase related image. For one example, the terminal 100 may recognize a swipe gesture of moving in a top direction as a command for saving as a normal image. And, the terminal 100 may recognize a swipe gesture of moving in a bottom direction as a command for saving as a purchase related image. The terminal 100 may display an indicator indicating an image storage type. In order to indicate normal image storage, the terminal 100 may display an upward arrow 2 and an icon indicating an image. In order to indicate purchase related image storage, the terminal 100 may display a downward arrow 4 and an icon indicating a purchase.

A swipe gesture may mean a gesture of moving in one direction by maintaining a touch to a prescribed point on a screen. For example, the swipe gesture may include one of a drag gesture, a flicking gesture and the like.

A purchase related image can be saved by linking to a captured site, a product related address and the like. IF a product searched site is a site accessed through a personal authentication procedure, a purchase related image may contain personal authentication information as well. Hence, if a purchase related image is selected, the terminal 100 may display a purchase related screen based on a linked site and a product information. In case that personal authentication is required, the terminal 100 can display a purchase related screen without an additional authentication procedure using a personal authentication information contained in a purchase related image. The terminal 100 may encrypt the personal authentication information contained in the purchase related image and then save the encrypted information. A detailed purchase process shall be described later.

The terminal 100 may save the purchase related image together with other normal images. Namely, the terminal 100 may sort and display the stored images based on a photographed or captured time order or the like.

Figure 4:
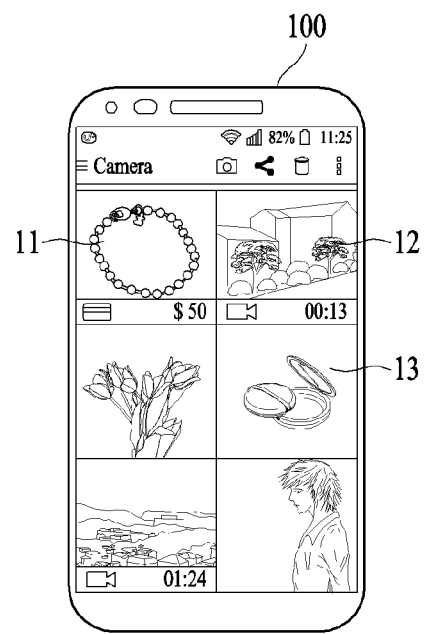
FIG. 4 shows a thumbnail image screen according to one embodiment of the present invention.

FIG. 4 shows a thumbnail image screen according to one embodiment of the present invention.

Referring to FIG. 4, illustrated is a terminal 100 that displays thumbnail images of a purchase related image 11 and normal images 12 and 13. A user may launch an image display application for displaying stored images. Namely, the terminal 100 may receive an input of an image display command. If receiving the image display command, the terminal 10 may display a thumbnail image of a stored image. Hence, the image display command may be referred to as a thumbnail image display command.

As described above, if the normal images 12 and 13 exist, the terminal 100 can display the purchase related image 11 together with the normal images 12 and 13. The terminal 100 can display the purchase related image 11 by adjusting a product image to be located in a center area. And, the terminal 100 may display the purchase related image 11 in a manner that an information for a purchase and a purchase button are contained within the purchase related image 11. A user can recognize the purchase related image 11 by seeing the purchase button.

Normal images may include a video image 12 and a still image 13. The terminal 100 may display the video image in a manner that an icon indicating a video and a play time are contained in the video image 12. And, the terminal 100 may display the still image 13 without any mark.

Meanwhile, the terminal 100 may display purchase related images only according to a sorting and filtering command, or collect and display purchase related images. If the purchase button of the purchase related image 11 is selected, the terminal 100 can perform a purchase process.

Figure 5:
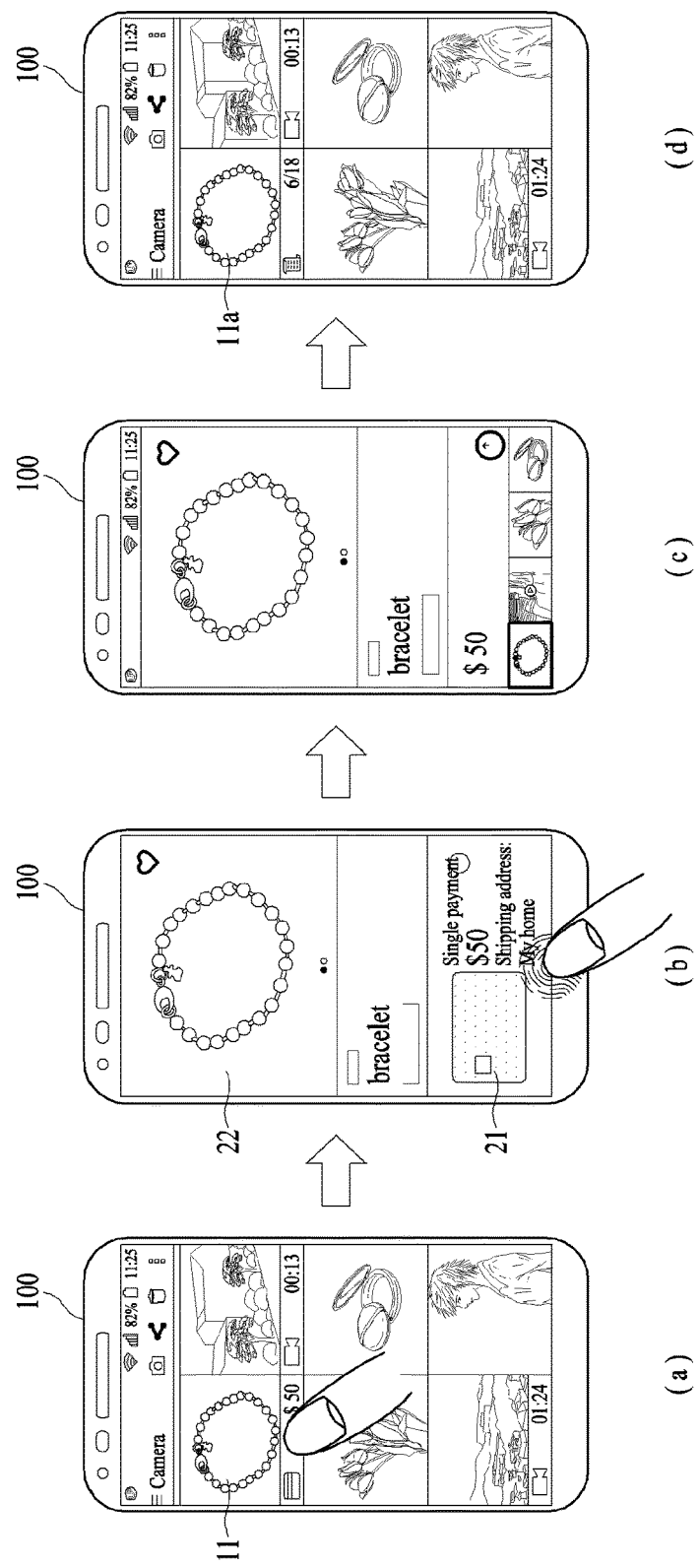
FIG. 5 is a diagram to describe a process for purchasing a product using an image according to one embodiment of the present invention.

FIG. 5 is a diagram to describe a process for purchasing a product using an image according to one embodiment of the present invention.

Referring to FIG. 5 (*a*), illustrated is a terminal 100 that displays thumbnail images. As described above, the terminal 100 can display both a purchase related image 11 and normal images. A user can select a purchase button in the purchase related image 11.

Referring to FIG. 5 (*b*), illustrated is the terminal 100 that displays a purchase related screen. If the purchase button is selected, the terminal 100 can display the purchase related screen 22. The purchase related screen 22 may contain a card 21 set as a default. The terminal 100 may display a price of a product and a preset shipping address information together with the card 21. As described above, the terminal 100 links information of a purchase related site, a product address and the like to the purchase related image 11. If personal authentication information is included, the terminal 100 can encrypt and save the personal authentication information as well. Hence, when the purchase related screen 22 is displayed, the terminal 100 can connect to a product sales site using the linked site address and the personal authentication information.

The purchase related screen 22 displayed by the terminal 100 may include a captured product image, a preset card 21, an information for a purchase, a shipping address information and the like. Although the terminal 100 has accessed the product sales site by performing a personal information authentication process, a user can check information related to a captured product only. Since the personal information authentication process is progressed by being encrypted and is not shown to a user, personal information used for the authentication process can be protected. And, the terminal 100 may request an input of fingerprint. If an inputted fingerprint matches a preset fingerprint, the terminal 100 can complete the payment.

A user may set a plurality of cards in the terminal 100. The terminal 100 may display a single card as a basic card. And, the terminal 100 can display a switch button for switching to another card. If the switch button is selected, the terminal 100 can change a currently displayed card into another card. While the changed card is displayed, if a fingerprint is inputted, the terminal 100 can perform a payment process using the changed card. If a payment for a purchase is completed, the terminal 100 may switch to a general image screen containing the purchased product.

Referring to FIG. 5 (*c*), illustrated is the terminal 100 that displays a payment completed purchase related image. If the payment for the purchase is completed, the terminal 100 can display the purchase related image like a normal image. Hence, the terminal 100 may display the captured image and also display a stored image list only. And, the terminal 100 may delete the information linked for the purchase.

Referring to FIG. 5 (*d*), illustrated is the terminal 100 that displays thumbnail images. The terminal 100 may display a purchase related image 11*a* and normal images as thumbnail images. If the payment is ended, the terminal 100 can display a receipt button by switching the purchase button to the receipt button. And, the terminal 100 can display payment statement information by switching the information for the purchase to the payment statement information. For example, the terminal 100 may display purchase date information by switching the price information to the purchase date information.

Meanwhile, the terminal 100 can skip a screen of a prescribed step among the screens of the respective steps shown in FIG. 5. For example, a user may select an image area instead of the purchase button in FIG. 5 (*a*). Namely, the terminal 100 may receive an input of a selection command of an image area instead of a purchase button area. If the image area is selected, the terminal 100 can switch not to the purchase related screen 22 shown in FIG. 5 (*b*) but to the captured image screen shown in FIG. 5 (c). Yet, since the payment is not completed, the terminal 100 can maintain the linked information.

For another example, the terminal 100 receives an input of a fingerprint in FIG. 5 (b) and is then able to complete the payment. If the payment is completed, the terminal 100 can switch not to the captured image screen shown in FIG. 5 (c) but to the thumbnail image display screen shown in FIG. 5 (d).

So far, described is the embodiment of a process for the terminal 100 to perform a purchase process in a purchase related image containing personal information. In other words, a user can log in to a product sales site by inputting personal information. The logged-in product sales site may contain personal information such as user's contact, shipping address information and the like. The user may search for a product and save it as a purchase related image. The terminal 100 can save the purchase related image by linking the logged-in personal information to the purchase related image. The terminal 100 can directly perform a purchase process in the purchase related image containing the personal information. Described in the following is an embodiment of a process for the terminal 100 to perform a purchase process in a purchase related image failing to contain personal information.

Figure 6:
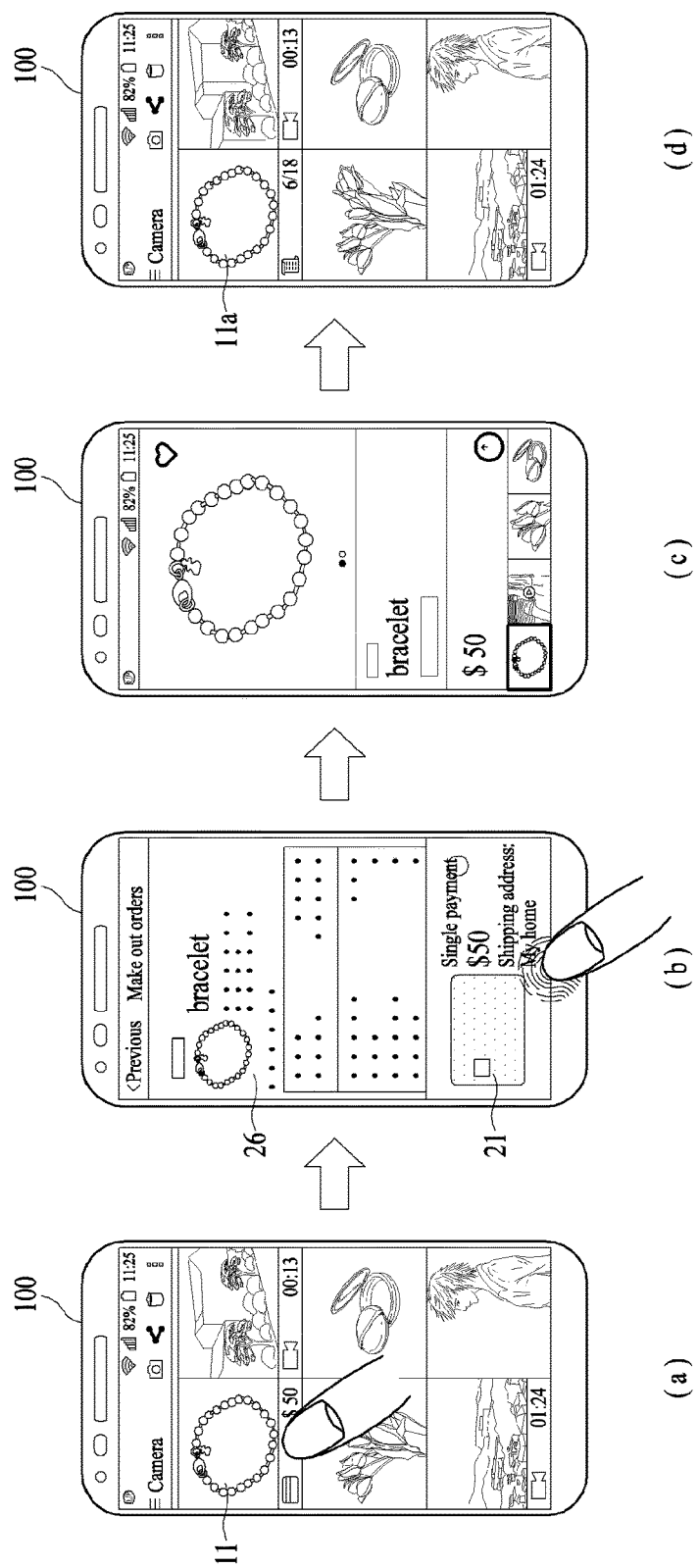
FIG. 6 is a diagram to describe a process for purchasing a product using an image according to another embodiment of the present invention.

FIG. 6 is a diagram to describe a process for purchasing a product using an image according to another embodiment of the present invention.

Referring to FIG. 6 (a), illustrated is a terminal 100 that displays thumbnail images. As described above, the terminal 100 can display both a purchase related image 11 and normal images. A user can select a purchase button in the purchase related image 11.

Referring to FIG. 6 (b), illustrated is the terminal 100 that displays a purchase related screen. If the purchase button is selected, the terminal 100 can display the purchase related screen 26. Yet, the purchase related image 11 shown in FIG. 6 (a) may not contain personal information. So to speak, a user can search for a product without logging in to a product sales site. The user may capture a found product and then save it as the purchase related image 11. Since the user has not logged in, the terminal 100 is not aware of user's personal information. Hence, when saving the purchase related image 11, the terminal 100 is unable to link the user's personal information. Yet, the terminal 100 may save the purchase related image 11 by linking information such as an address of the product sales site, an address of a product displayed page or the like. Hence, if the purchase button is selected, the terminal 100 can connect to the product sales site or the product displayed page. The user can input personal information at the connected site or page. Based on the inputted personal information, the terminal 100 can display a preset card 21 and information related to a purchase. Namely, the terminal 100 may display the purchase related screen 26 and also display the card 21 set as a default for payment.

And, the terminal 100 may request an input of fingerprint. If an inputted fingerprint matches a preset fingerprint, the terminal 100 can complete the payment.

A user may set a plurality of cards in the terminal 100. The terminal 100 may display a single card as a basic card. And, the terminal 100 can display a switch button for switching to another card. If the switch button is selected, the terminal 100 can change a currently displayed card into another card.

Referring to FIG. 6 (c), illustrated is the terminal 100 that displays a payment completed purchase related image. If the payment for the purchase is completed, the terminal 100 can display the purchase related image like a normal image. Hence, the terminal 100 may display the captured image and also display a stored image list only. And, the terminal 100 may delete the information linked for the purchase.

Referring to FIG. 6 (d), illustrated is the terminal 100 that displays thumbnail images. The terminal 100 may display a purchase related image 11a and normal images as thumbnail images. If the payment is ended, the terminal 100 can display a receipt button by switching the purchase button to the receipt button. And, the terminal 100 can display payment statement information by switching the information for the purchase to the payment statement information. For example, the terminal 100 may display purchase date information by switching the price information to the purchase date information.

As described above, the terminal 100 can skip a screen of a prescribed step among the screens of the respective steps shown in FIG. 6. For example, if a user selects an image area instead of the purchase button in FIG. 6 (a), the terminal 100 may display the captured image screen shown in FIG. 6 (c). Yet, since the payment is not completed, the terminal 100 can maintain the linked information.

For another example, the terminal 100 receives an input of a fingerprint in FIG. 6 (b) and is then able to complete the payment. If the payment is completed, the terminal 100 can display the thumbnail image display screen shown in FIG. 6 (d).

Figure 7:
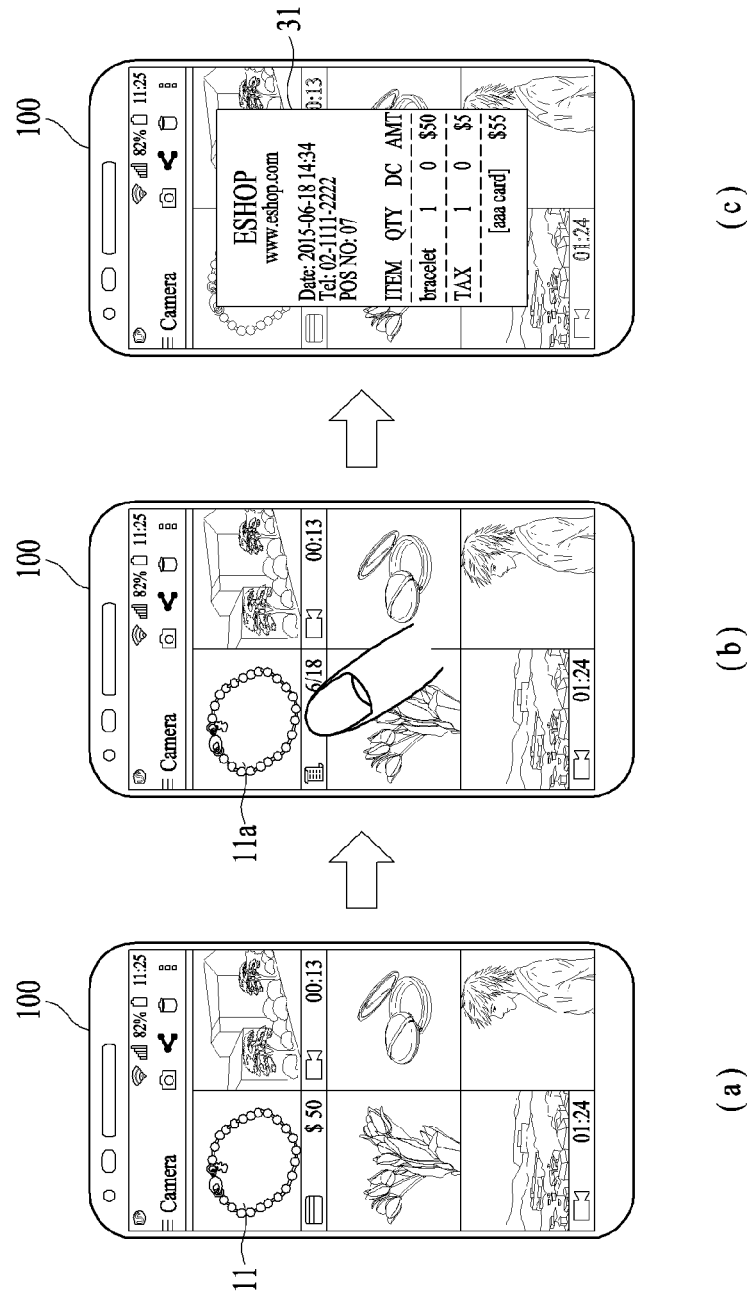
FIG. 7 is a diagram to describe a process for checking a receipt in an image according to one embodiment of the present invention.

FIG. 7 is a diagram to describe a process for checking a receipt in an image according to one embodiment of the present invention.

Referring to FIG. 7 (a), illustrated is a terminal 100 that displays thumbnail images. The terminal 100 can display both a purchase related image 11 and normal images. If a purchase button in the purchase related image 11 is selected, the terminal 100 may display a purchase related screen. The purchase related screen may contain a card set for payment. If receiving an input of a fingerprint, the terminal 100 may perform a purchase procedure. After completion of the purchase, the terminal 100 may display a thumbnail image screen again automatically or in response to a user's command.

Referring to FIG. 7 (b), illustrated is the terminal 100 that displays thumbnail images after purchase completion. The terminal 100 may display a purchase related image 11a. Yet, the payment completed purchase related image 11a may contain a receipt button instead of the purchase button and also contain payment statement information instead of the information for the purchase. For one example, the payment completed purchase related image 11a may contain purchase date information instead of price information. A user may select the receipt button.

Referring to FIG. 7 (c), illustrated is the terminal 100 that displays receipt information. If the receipt button is selected, the terminal 100 may display receipt information 31. The receipt information may be displayed in the same form of an offline provided receipt or in form generated for online. Or, if the payment is completed, the terminal 100 may receive payment statement information, extract necessary information from the received information, and provide the receipt information 31 generated from reconfiguring the extracted information.

Meanwhile, the terminal 100 may provide receipt summary information.

Figure 8:
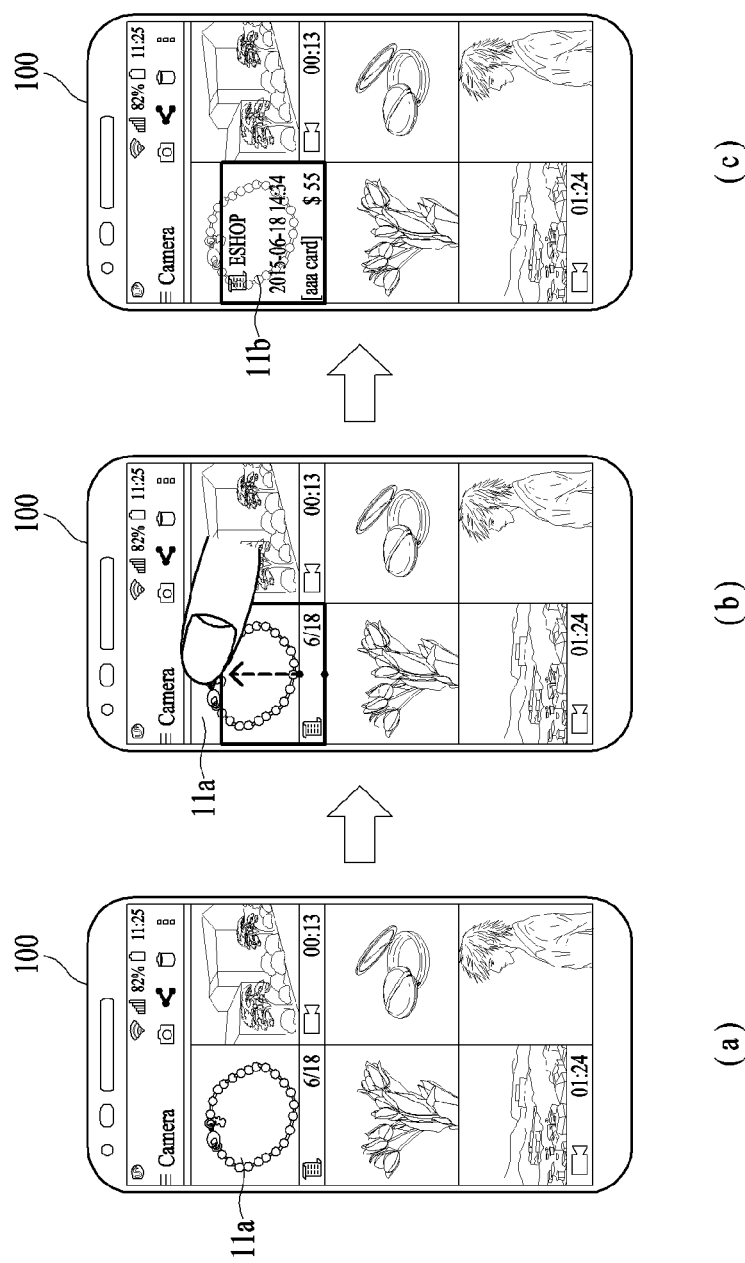
FIG. 8 is a diagram to describe a process for checking receipt summary information in an image according to one embodiment of the present invention.

FIG. 8 is a diagram to describe a process for checking receipt summary information in an image according to one embodiment of the present invention.

Referring to FIG. 8 (a), illustrated is a terminal 100 that displays thumbnail images after purchase completion. The terminal 100 may display a purchase related image 11a. Yet, the payment completed purchase related image 11a may contain a receipt button instead of a purchase button and also contain payment statement information instead of information for a purchase. For one example, the payment completed purchase related image 11a may contain purchase date information instead of price information.

Referring to FIG. 8 (b), illustrated is the terminal 100 that receives an input of a gesture for extending the receipt button. A user can input a swipe gesture on the receipt button within the purchase related image 11a. The terminal 100 can extend a receipt button area in response to the input of the swipe gesture. The user can end the touch after extending the receipt button area.

Referring to FIG. 8 (c), illustrated is the terminal 100 that displays receipt summary information. The terminal 100 may extend the receipt button area to an image area in response to the inputted swipe gesture. The terminal 100 can display receipt summary information on the extended receipt button area 11b according to the end of the touch. For example, the receipt summary information may include information such as a product purchased site name, a payment date, a used card, a payment amount and the like.

The user may input a swipe gesture in an opposite direction by touching an edge portion of the extended receipt button area 11b. The terminal 100 may reduce the extended receipt button area 11b in response to the inputted swipe gesture. If the extended receipt button area 11b gets equal to or smaller than a preset size, the terminal 100 can set a size of the receipt button area to an original size.

Meanwhile, the terminal 100 may merge a plurality of purchase related images together.

Figure 9:
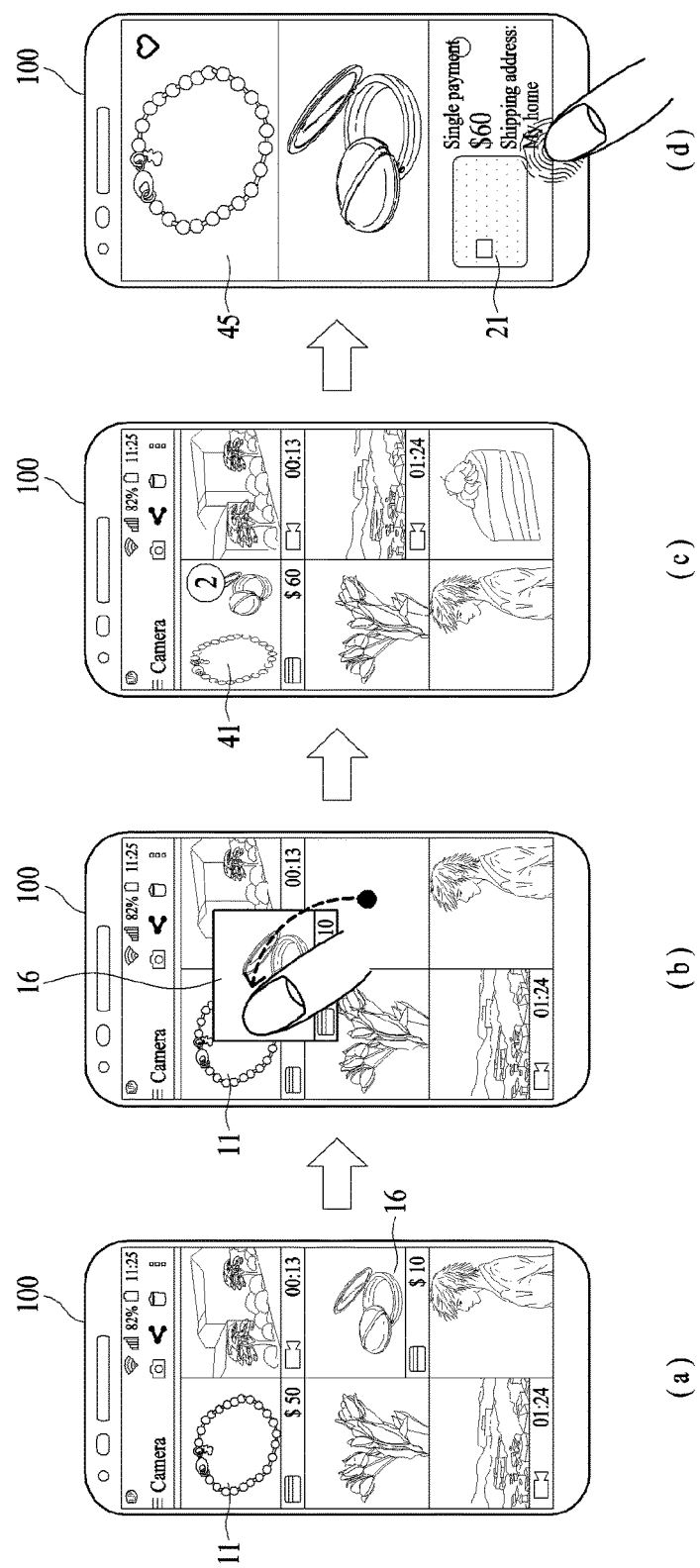
FIG. 9 is a diagram to describe a process for purchasing a product by merging two images according to one embodiment of the present invention.

FIG. 9 is a diagram to describe a process for purchasing a product by merging two images according to one embodiment of the present invention.

Referring to FIG. 9 (a), illustrated is a terminal 100 that contains a plurality of purchase related images 11 and 16. As described above, the terminal 100 can display the purchase related images 11 and 16 together with other normal images. Each of a plurality of the purchase related images 11 and 16 may contain an image of a product, a purchase button, information for a purchase and the like. For description, a plurality of the purchase related images 11 and 16 may be called a first purchase related image 11 and a second purchase related image 16, respectively.

Referring to FIG. 9 (b), illustrated is the terminal 100 on which the second purchase related image 16 is moved. One of a plurality of the purchase related images 11 and 1'6 can be moved. A user selects one purchase related image and is then able to input a gesture for moving the selected image by maintaining the selection. As shown in FIG. 9 (b), the terminal 100 can move the second purchase related image 16 in a direction of the first purchase related image 11 in response to the user's gesture. If the first purchase related image 11 and the second purchase related image 16 overlap with each other by a preset area, the terminal 100 can merge the first purchase related image 11 and the second purchase related image 16 together.

Referring to FIG. 9 (c), illustrated is the terminal 100 in which the first purchase related image 11 and the second purchase related image 16 are merged together. The terminal 100 may display a merged purchase related image 41 by merging the first and second purchase related images 11 and 16 together. The terminal 100 may display the merged purchase related image 41 containing two product images.

And, the terminal 100 may display the number of merged products. The terminal 100 may display a merged purchase related image containing two or more product images. For one example, the terminal 100 may display all product imaged within a merged purchase related image. Or, the terminal 100 may display two product images among two or more products only and also display the number of all products.

The terminal 100 may display merged information for purchases by merging information for a first purchase of the first purchase related image 11 and information for a second purchase of the second purchase related image 16 together. For example, information for a purchase may include price information. As shown in FIG. 9, the first purchase related image 11 displays $50 and the second purchase related image 16 displays $10. Hence, the merged purchase related image 41 can display $60 by merging the information for the first purchase and the information for the second purchase together.

If the user selects a purchase button of the merged purchase related image 41, a payment process for all products contained in the merged purchase related image 41 can be performed.

Referring to FIG. 9 (d), illustrated is the terminal 100 that performs a payment process for all products contained in the merged purchase related image. If the purchase button of the merged purchase related image 41 is selected, the terminal 100 can perform a payment process for all products contained in the merged purchase related image 41. For one example, as shown in FIG. 9 (d), the terminal 100 can display a purchase related screen for purchasing a first product and a second product contained in the merged purchase related image 41. And, the terminal 100 can display a preset card 21 for payment as well. If the terminal 100 includes personal information on all purchase related images, the terminal 100 may automatically perform a personal information authentication process. The terminal 100 may receive an input of a fingerprint, perform a fingerprint authentication process, and then complete payments.

Meanwhile, the terminal 100 may separate the first purchase related image 11 and the second purchase related image 16 from the merged purchase related image 41.

Figure 10:
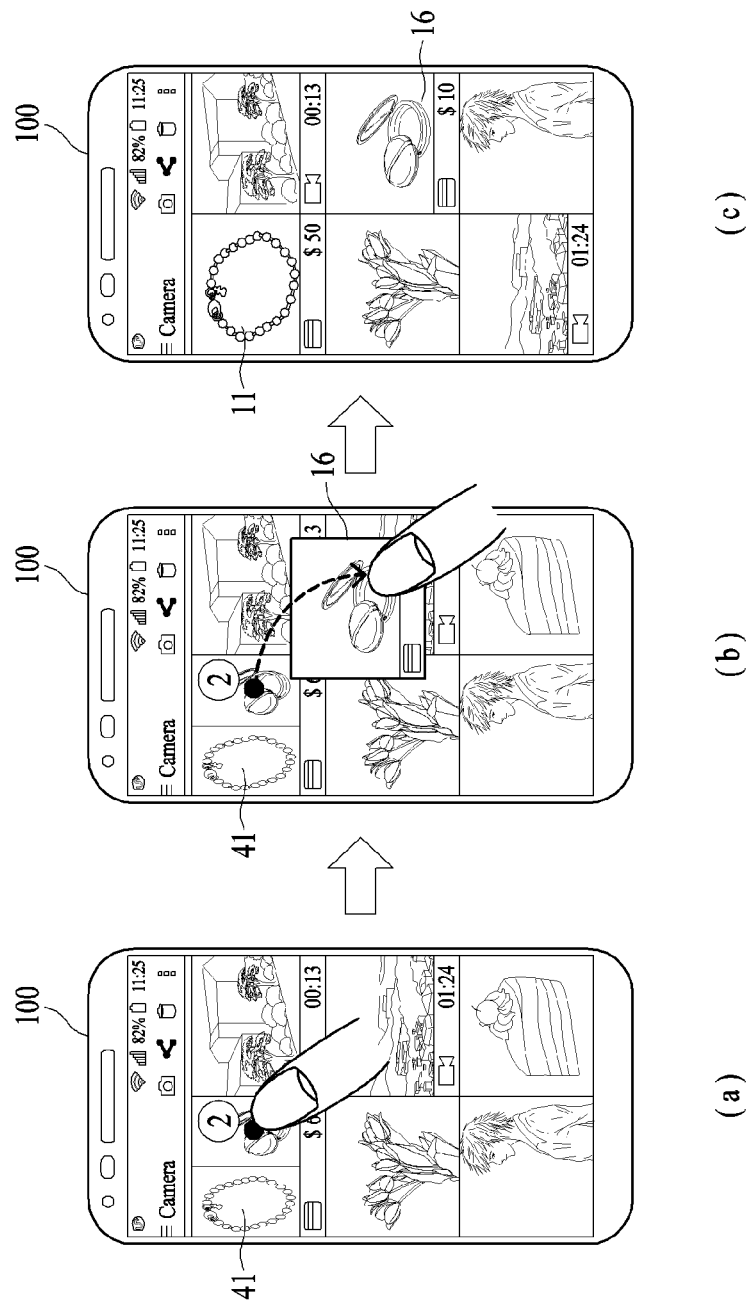
FIG. 10 is a diagram to describe a process for separating a merged image according to one embodiment of the present invention.

FIG. 10 is a diagram to describe a process for separating a merged image according to one embodiment of the present invention.

Referring to FIG. 10 (a), illustrated is a terminal 100 on which a merged purchase related image 41 is displayed. A user can select a second product area of the merged purchase related image 41.

Referring to FIG. 10 (b), illustrated is the terminal 100 on which a second purchase related image 16 is moved. The user can input a gesture for selecting and moving the second product area of the merged purchase related image 41. The terminal 100 may move the second purchase related image 16 containing a second product in response to the inputted gesture.

Referring to FIG. 10 (c), illustrated is the terminal 100 on which a first purchase related image 11 and the second purchase related image are separated from each other. If the second purchase related image 16 is spaced apart from the first purchase related image 11 over a predetermined distance, the terminal 100 can display each purchase related image by separating the merged purchase related image 41 into the respective purchase related images. Or, if an overlapping area between the second purchase related image 16 and the merged purchase related image 41 becomes equal to or smaller than a predetermined area, the terminal 100 can display the first purchase related image 11 and the second purchase related image 16 separately. And, the terminal 100 can display each purchase related information separately.

The terminal 100 may merge the first purchase related image 11 and the second purchase related image 16 together. And, the terminal 100 may merge and manage informations for purchases. Moreover, the terminal 100 may mange a first purchase related information and a second purchase related information together. Hence, although separating the merged purchase related image again, the terminal 100 may display each purchase related image containing an original purchase related information.

Namely, the terminal 100 can display the first purchase related image 11 and the second purchase related image 16 separately, display information for a first purchase and information for a second purchase separately, and also display a first purchase button and a second purchase button separately.

Meanwhile, the terminal 100 may perform an individual purchase process of a product on a merged purchase related image.

Figure 11:
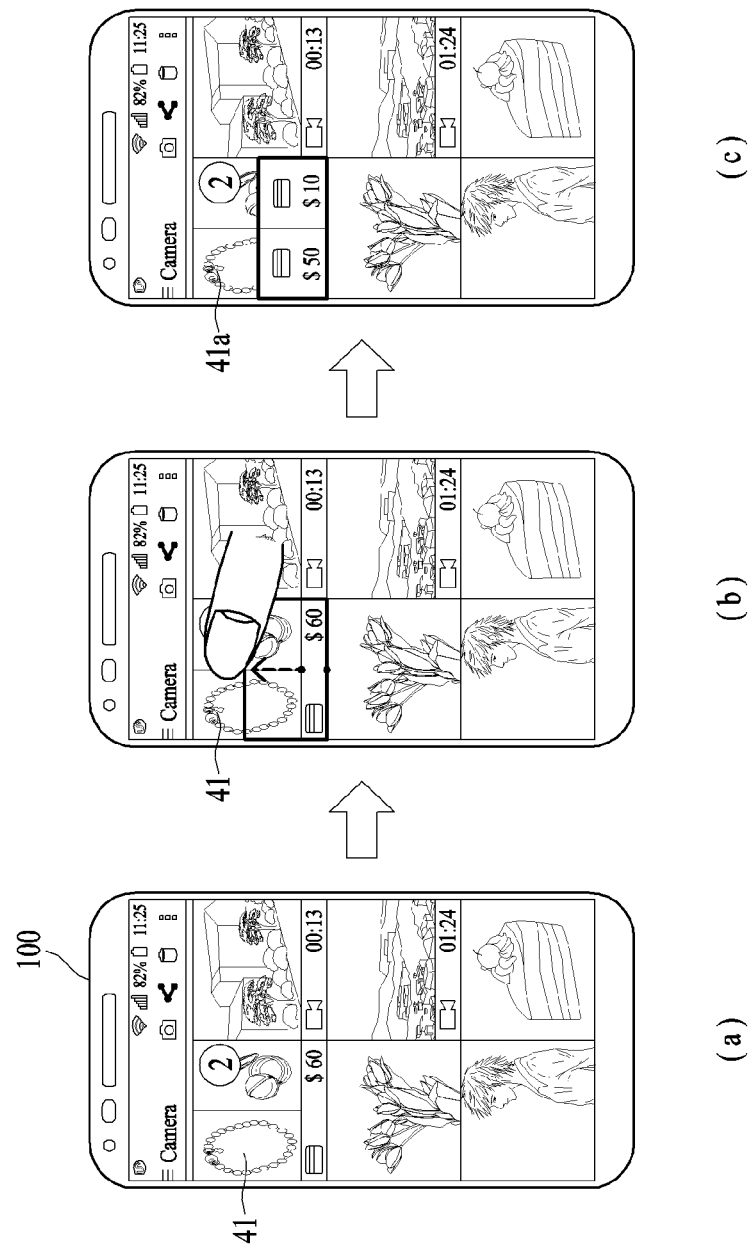
FIG. 11 is a diagram to describe a process for individually purchasing a product contained in a merged image according to one embodiment of the present invention.

FIG. 11 is a diagram to describe a process for individually purchasing a product contained in a merged image according to one embodiment of the present invention.

Referring to FIG. 11 (a), illustrated is a terminal 100 on which a merged purchase related image 41 is displayed. The merged purchase related image 41 may contain a first product image and a second product image. And, the merged purchase related image 41 may contain a purchase button area and information for a merged purchase.

Referring to FIG. 11 (b), illustrated is the terminal 100 on which the purchase button area of the merged purchase related image 41 is extended. A user may input a swipe gesture to the purchase button area. The terminal 100 may extend the purchase button area in response to the inputted gesture. If the user's touch is ended, the terminal 100 may display information on the extended purchase button area.

Referring to FIG. 11 (c), illustrated is the terminal 100 on which information for each purchase is displayed. The terminal 100 may extend the purchase button area of the merged purchase related image 41a in response to the inputted gesture. The terminal 100 may display information and a purchase button for each product contained in the merged purchase related image 41a.

Namely, the merged purchase related image 41a may contain a first product and a second product. If the purchase button area is extended, the terminal 100 may display an information and purchase button for a purchase of the first product. And, the terminal 100 may display an information and purchase button for a purchase of the second product. If the purchase button of the first product is selected, the terminal 100 may perform a procedure for purchasing the first product. If the purchase button of the second product is selected, the terminal 100 may perform a procedure for purchasing the second product.

Meanwhile, the terminal 100 may extract a product from a normal image and then progress a purchase procedure of the extracted product.

Figure 12:
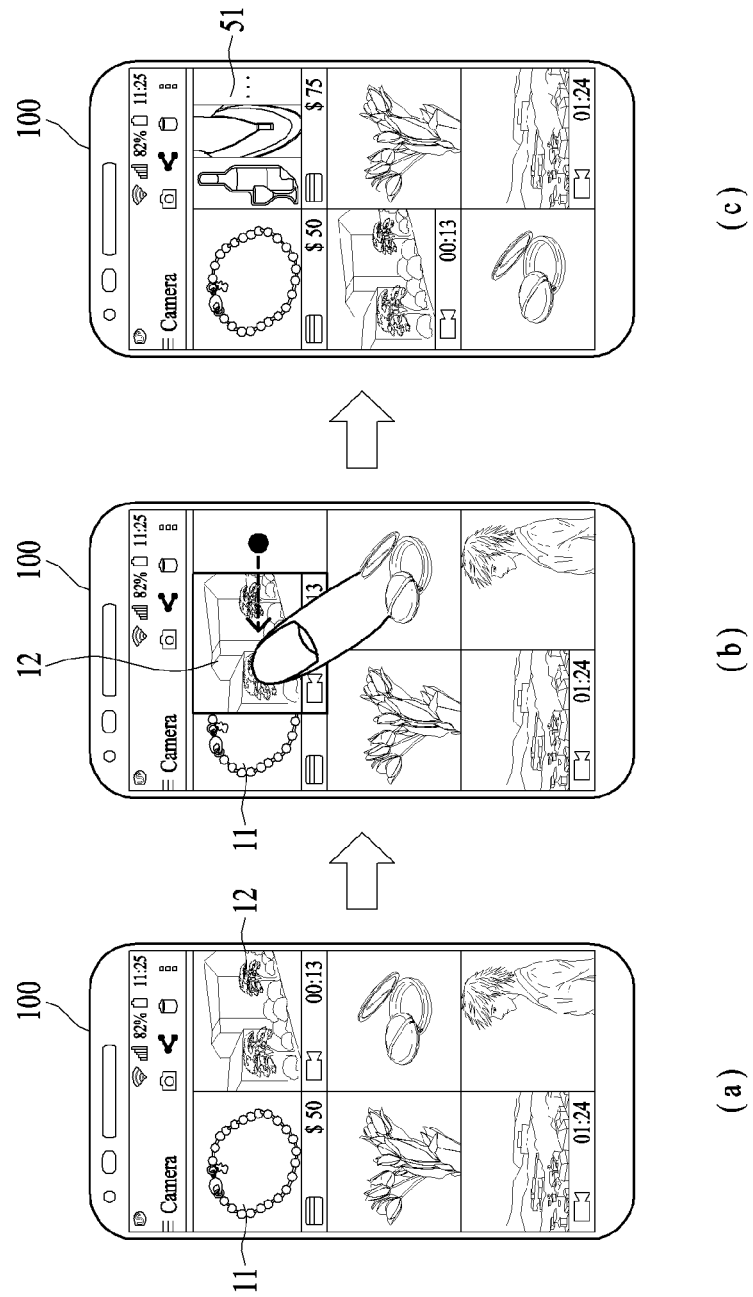
FIG. 12 is a diagram to describe a process for extracting a purchasable product from a normal image according to one embodiment of the present invention.

FIG. 12 is a diagram to describe a process for extracting a purchasable product from a normal image according to one embodiment of the present invention.

Referring to FIG. 12 (a), a terminal 100 may display a purchase related image 11, a normal image 12 and the like. A normal image may include a still image and a video image. A user may input a command for moving the normal image 12 to the purchase related image 11.

Referring to FIG. 12 (b), illustrated is the terminal 100 on which the normal image 12 is moved to the purchase related image 11. If the normal image 12 overlaps with an area of the purchase related image 11 over a preset size according to an inputted gesture, the terminal 100 may determine that the normal image 12 is moved to the purchase related image 11. If the normal image 12 is moved to the purchase related image 11, the terminal 100 may extract a product contained in the normal image 12. The extracted product may include a purchasable item.

Referring to FIG. 12 (c), illustrated is the terminal 100 on which a normal image is switched to an image 51 for a purchase. The terminal 100 may extract a product from the normal image 12. If the normal image 12 is a video image, the terminal 100 may extract a product by analyzing each frame of the video image.

For one example, the purchase related image 11 may contain an A-site address for purchasing a product. The terminal 100 may extract an image of a product from the normal image 12. And, the terminal 100 may search an A-site for a product corresponding to the extracted image of the product. If the terminal 100 finds a product identical to or similar at a predetermined rate or higher to the extracted image of the product from the A-site, the terminal 100 can control the information for the purchase extracted from the A-site to be contained in the extracted image of the product. The terminal 100 may extract a plurality of products and repeatedly perform the aforementioned process on a plurality of the extracted products. If the extracted image of the product fails to match a product sold by the A-site, the terminal 100 can delete the extracted image and information of the product.

If the terminal 100 extracts a plurality of products and links information for a purchase to a plurality of the extracted products, the terminal 100 may display an extracted purchase related image 51 similar to a merged purchase related image. Similarly to the aforementioned manner, if a purchase button area is extended, the terminal 100 may progress an individual product purchase procedure.

The terminal 100 may extract a product from the normal image 12 and then switch it to an image 51 for a purchase. Meanwhile, the terminal 100 may switch to the image 51 for the purchase and delete the normal image 12. Or, the terminal 100 may maintain the normal image 12. Or, the terminal 100 may create the image 51 for the purchase separately from the normal image 12.

Meanwhile, the terminal 100 may progress a purchase procedure simply and conveniently at an offline store or in the course of web surfing.

Figure 13:
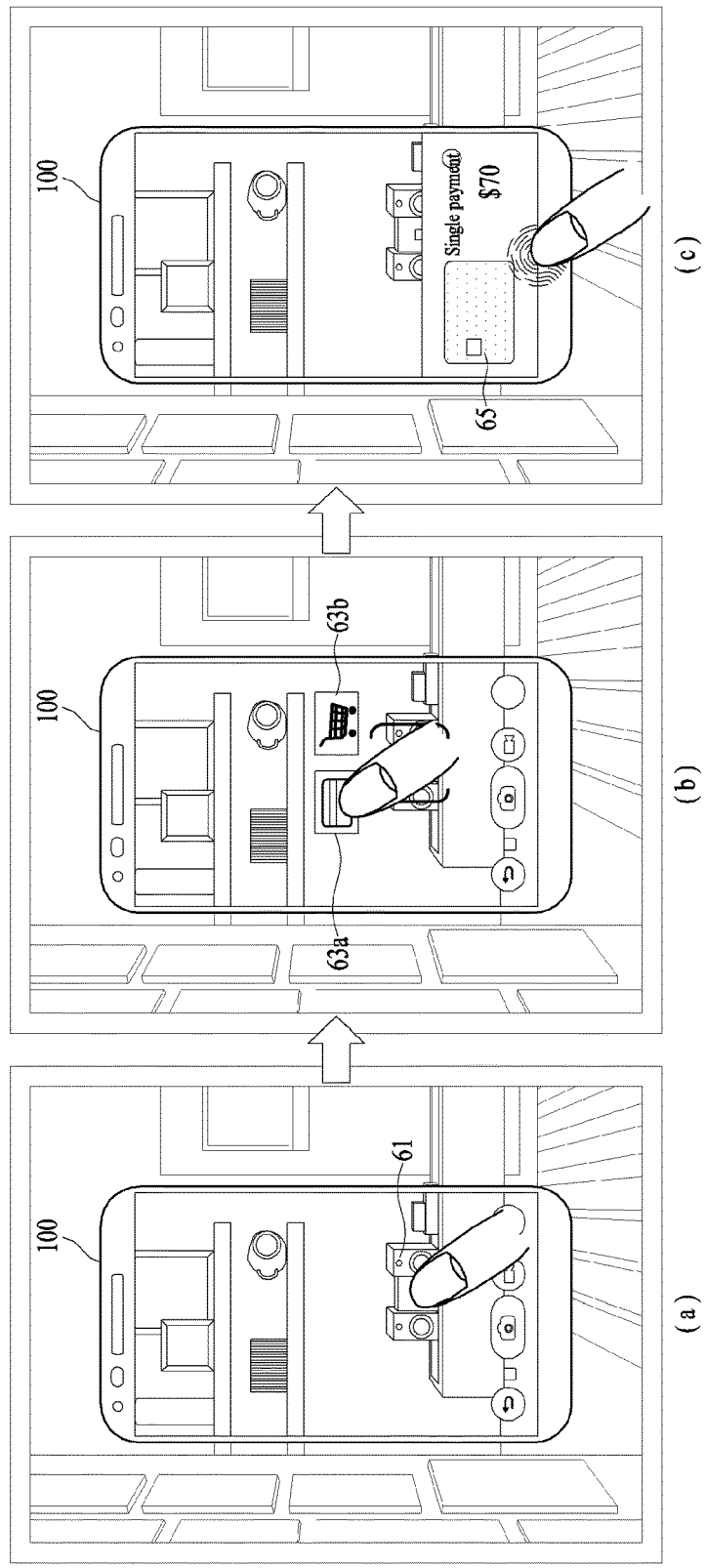
FIG. 13 is a diagram to describe a process for purchasing a product at an offline store using a preview screen according to one embodiment of the present invention.

FIG. 13 is a diagram to describe a process for purchasing a product at an offline store using a preview screen according to one embodiment of the present invention.

Referring to FIG. 13 (a), illustrated is a terminal 100 that displays a product as a preview at an offline store. A user can launch a camera function. The terminal 100 may display a product 61 arranged at the offline store. The user can select the displayed product 61 from a screen.

Referring to FIG. 13 (b), illustrated is the terminal 100 that displays a menu of a purchase 63a and a menu of a shopping basket 63b. And, a server (not shown) of the offline store can communicate with the terminal 100 using a short-range communication network or the like. The terminal 100 may determine a selected product 61. The terminal 100 may make a request for purchase information of the product 61 to the server. If the user selects the shopping basket 63b, the terminal 100 may put the selected product 61 in the shopping basket. If the user selects the menu of the purchase 63a, the terminal 100 can performs a payment process.

Referring to FIG. 13 (c), illustrated is the terminal 100 that performs the payment process. If the purchase 63a is selected, the terminal 100 can perform the payment process. The terminal 100 may display a preset card 65 and also display purchase information of a product received from the server. For example, the terminal 100 may display a name of a product, a price information of a product and the like. The terminal 100 may perform an authentication process by receiving an input of a fingerprint from a user. In some cases, the terminal 100 may perform a user authentication process for user authentication requested from the server, or send user information to the server. The terminal 100 may sent payment information to the server. The server may receive or store information on a paid product and user. An employee of the offline store can deliver the purchased product to the user having purchased the product at an entrance/exit based on the purchased product and user information stored in the server.

Figure 14:
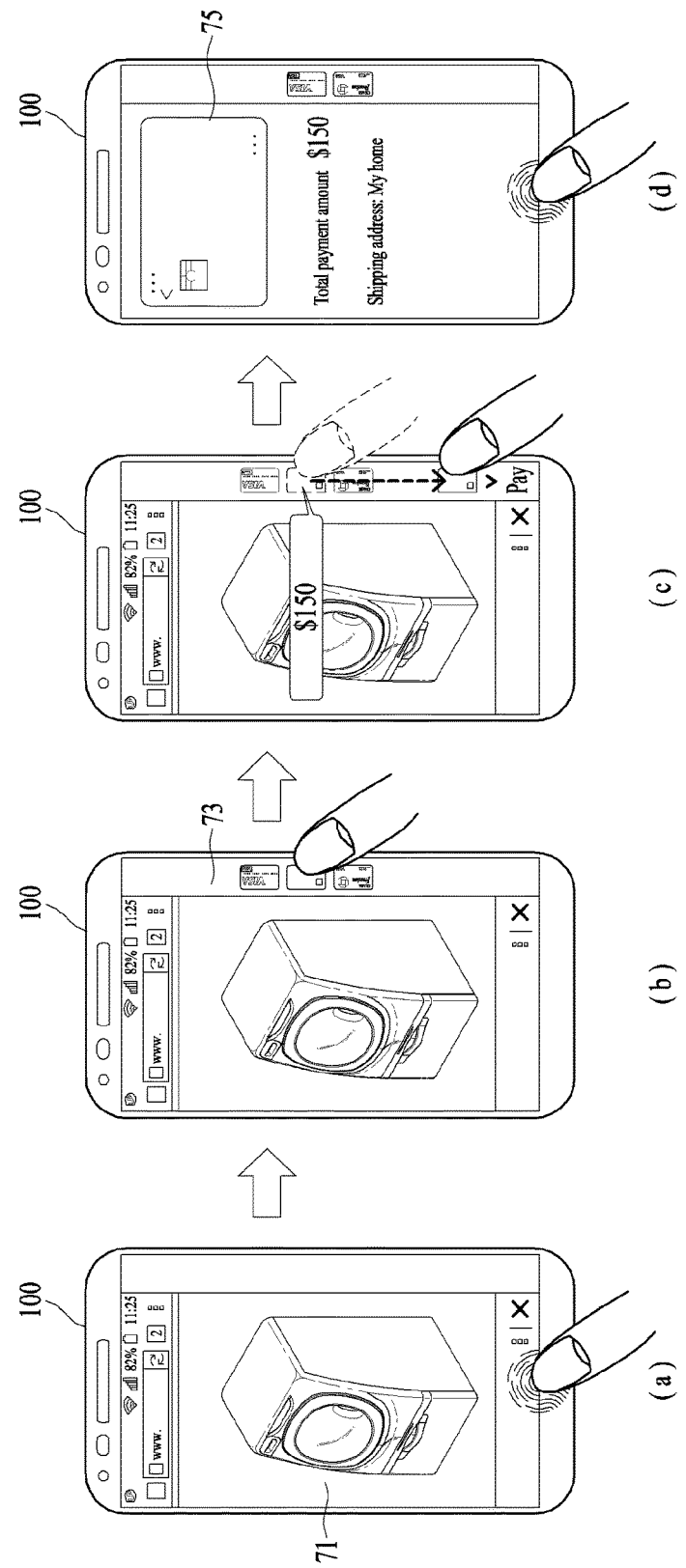
FIG. 14 is a diagram to describe a process for purchasing a product on an internet search screen according to one embodiment of the present invention.

FIG. 14 is a diagram to describe a process for purchasing a product on an internet search screen according to one embodiment of the present invention.

Referring to FIG. 14 (a), illustrated is a terminal 100 that has found a product through a search. A user may surf Internet using the terminal 100. The terminal 100 can display a product 71 in the course of the surfing. The user may check a detailed page related to the displayed product 71 and then input a fingerprint. The terminal 100 may progress a purchase procedure of the displayed product 71.

Referring to FIG. 14 (b), illustrated is the terminal 100 that displays a payment card. If receiving an input of a fingerprint, the terminal 100 may access a site at which the displayed product 71 can be purchased. The terminal 100 may access a purchase site frequently accessed by the user. Or, the terminal 100 may compare prices at sites that sell the displayed product 71 and then access the site that sells the product 71 at the lowest price. And, the terminal 100 may display a stored card.

Referring to FIG. 14 (c), illustrated is the terminal 100 from which a card is selected. The user may select a card for payment from a plurality of cards. The terminal 100 may display a plurality of cards on a sub-area. For one example, the terminal 100 may display a cancel menu and a pay menu at a top end and a bottom end of the sub area, respectively. The user may select one of the displayed cards and then move it to the pay menu through a swipe gesture. In response to the inputted swipe gesture, the terminal 100 may move the selected card to the pay menu and perform a payment process using the selected card. The terminal 100 may send personal information necessary to purchase the displayed product 71 at the accessed site to a server of the site or perform a personal information authentication process. If a card is selected, the terminal 100 may switch to a payment screen.

Referring to FIG. 14 (d), illustrated is the terminal 100 that displays the payment screen. The terminal 100 may display information related to a selected card 75, information related to the product 71, information related to the purchase and the like. If receiving an input of a fingerprint, the terminal 100 may complete the payment.

According to the aforementioned various embodiments, the terminal 100 can conveniently perform a product purchase process through an image. A flowchart for a method of controlling a terminal is described as follows.

Figure 15:
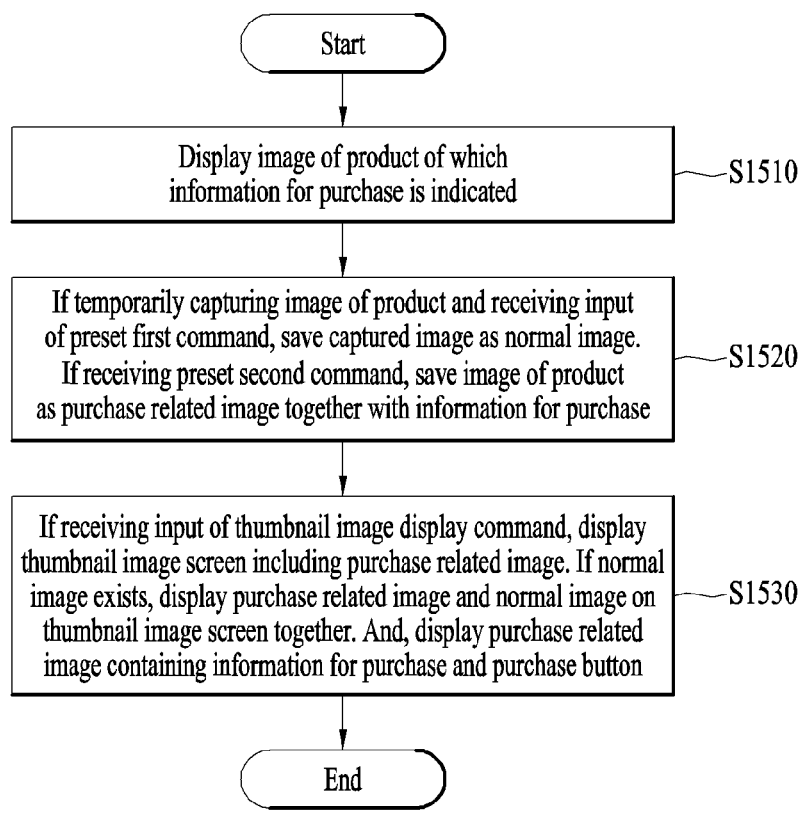
FIG. 15 is a flowchart for a method of controlling a terminal according to one embodiment of the present invention.

FIG. 15 is a flowchart for a method of controlling a terminal according to one embodiment of the present invention.

Referring to FIG. 15, a terminal may display an image of a product of which information for a purchase is indicated [S1510]. If the terminal 100 temporarily captures the image of the product and receives an input of a preset first command, the terminal saves the captured image as a normal image. If receiving a preset second command, the terminal may save the image of the product as a purchase related image together with the information for the purchase [S1520]. The normal image may mean data saved in image format. And, the purchase related image may mean data saved in image format and data including a site address for purchasing a product, personal information for authentication and the like.

If receiving an input of a thumbnail image display command, the terminal may display a thumbnail image screen including the purchase related image. If a normal image exists, the terminal may display the purchase related image and the normal image on the thumbnail image screen together. And, the purchase related image may be displayed in a manner of containing information for a purchase and a purchase button [S1530]. The terminal may manage the normal image and the purchase related image together. The terminal may enable the purchase related image to be recognized by displaying the purchase button. The normal image may include a still image and a video image.

If the displayed purchase button is selected, the terminal may display a purchase related screen of the product. The purchase related screen may contain a product name, a price, a payment card and the like. If receiving an input of a fingerprint from the user, the terminal may complete the payment.

The above-described present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A terminal, comprising:
a display unit;
a memory;
a camera; and
a controller configured to:
control the display unit to display an image of a product obtained by the camera,
control the camera to capture the image of the product as a normal image in response to a preset first command,
control the camera to capture the image of the product as a purchase related image together with purchasing information for purchasing the product in response to a preset second command, and control the display unit to display a thumbnail image screen including the purchase related image and the normal image in response to an input of a thumbnail image display command.

2. The terminal of claim 1, wherein the controller is further configured to control the display unit to display the product in a center area within the purchase related image.

3. The terminal of claim 1, wherein the purchase related image includes a purchase button and the purchasing information.

4. The terminal of claim 3, wherein the controller is further configured to control the display unit to display a purchase related screen of the product in response to a selection of the displayed purchase button.

5. The terminal of claim 4, wherein the controller is further configured to control the display unit to display a payment card set as a default for payment on the purchase related screen.

6. The terminal of claim 5, wherein the controller is further configured to control the display unit to switch to displaying the thumbnail image screen when the payment is completed.

7. The terminal of claim 6, wherein the controller is further configured to control the display unit to display a receipt button by switching the purchase button to the receipt button and display payment statement information by switching the purchasing information to the payment statement information, when the payment is completed.

8. The terminal of claim 7, wherein the controller is further configured to control the display unit to display receipt information in response to a selection of the displayed receipt button.

9. The terminal of claim 7, wherein the controller is further configured to control the display unit to display summary information of a receipt in response to a swipe gesture on the displayed receipt button.

10. The terminal of claim 1, wherein the thumbnail image screen includes a first purchase related image and a second purchase related image,
wherein the first purchase related image includes an image of a first product, first purchasing information for purchasing the first product and a first purchase button,
wherein the second purchase related image includes an image of a second product, second purchasing information for purchasing the second product and a second purchase button, and
wherein in response to a movement of the first purchase related image to the second purchase related image, the controller is further configured to control the display unit to display a merged purchase related image by merging the first purchase related image and the second purchase related image together, display merged purchasing information for purchasing by merging the first purchase information and the second purchasing information, and display a merged purchase button by merging the first purchase button and the second purchase button.

11. The terminal of claim 10, wherein in response to a selection of the merged purchase button, the controller is further configured to control the display unit to display a purchase related screen including both the first product and the second product.

12. The terminal of claim 10, wherein in response to an input of a command for moving the first purchase related image within the merged purchase related image, the controller is further configured to control the display unit to display the first purchase related image and the second purchase related image separately, display the first purchasing information and the second purchasing information separately, and display the first purchase button and the second purchase button separately.

13. The terminal of claim 10, wherein in response to a swipe gesture on the displayed purchase button, the controller is further configured to control the display unit to display the first purchasing information and the second purchasing information separately and display the first purchase button and the second purchase button separately.

14. The terminal of claim 1, wherein in response to a moving command for moving the normal image to the purchase related image, the controller is further configured to control the display unit to display a purchase item contained in the normal image.

15. The terminal of claim 14, wherein the normal image comprises a video image.

16. The terminal of claim 14, wherein the controller is further configured to store the normal image having the purchase item as a new purchase related image.

17. A method of controlling a terminal, the method comprising:
displaying, via a display unit of the terminal, an image of a product obtained by a camera of the mobile terminal;
capturing, via the camera, the image of the product as a normal image in response to a preset first command;
capturing, via the camera, the image of the product as a purchase related image together with purchasing information for purchasing the product in response to a preset second command; and
displaying, via the display unit, a thumbnail image screen including the purchase related image and the normal image in response to an input of a thumbnail image display command.

18. The method of claim 17, further comprising displaying the product in a center area within the purchase related image.

19. The method of claim 17, wherein the purchase related image includes a purchase button and the purchasing information.

20. The method of claim 19, further comprising displaying a purchase related screen of the product on the display unit in response to a selection of the displayed purchase button.

* * * * *